US012190887B2

(12) United States Patent
Tran et al.

(10) Patent No.: US 12,190,887 B2
(45) Date of Patent: Jan. 7, 2025

(54) ADVERSARIAL SPEECH-TEXT PROTECTION AGAINST AUTOMATED ANALYSIS

(71) Applicant: International Business Machines Corporation, Armonk, NY (US)

(72) Inventors: Ngoc Minh Tran, Dublin (IE); Marco Simioni, Dublin (IE); Hessel Tuinhof, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 17/643,071

(22) Filed: Dec. 7, 2021

(65) Prior Publication Data

US 2023/0178079 A1 Jun. 8, 2023

(51) Int. Cl.

*G10L 15/26* (2006.01)
*G06N 20/00* (2019.01)
*G10L 21/0208* (2013.01)

(52) U.S. Cl.

CPC .............. *G10L 15/26* (2013.01); *G06N 20/00* (2019.01); *G10L 21/0208* (2013.01)

(58) Field of Classification Search

CPC ..... G10L 15/26; G10L 21/0208; G06N 20/00; G06F 40/30

See application file for complete search history.

(56) References Cited

U.S. PATENT DOCUMENTS 7,231,341 B2 6/2007 Bangalore et al.
7,966,172 B2 6/2011 Ruiz et al.
8,019,610 B2 9/2011 Walker et al.
8,024,331 B2 9/2011 Calistri-Yeh et al.
8,150,676 B1 4/2012 Kaeser
8,762,134 B2 6/2014 Reiter
9,576,009 B1 2/2017 Hammond et al.
10,896,664 B1 1/2021 Buesser et al.
2004/0098385 A1* 5/2004 Mayfield ............... G06F 16/313 707/E17.084
2010/0094628 A1* 4/2010 Bacchiani ............... G10L 15/32 704/235
2019/0043506 A1* 2/2019 Rivkin ...................... G06N 3/08
2021/0141876 A1* 5/2021 Veshchikov ............ G06F 21/31

(Continued)

FOREIGN PATENT DOCUMENTS

CN 112908300 A * 6/2021
CN 113204974 A * 8/2021 ........... G06F 40/247

OTHER PUBLICATIONS

Luz, “Time-based Memory Support in Collaborative Meetings: Speech Indexing Without Speech Recognition.” Trinity College, University of Dublin (2002), 18 pgs.

(Continued)

*Primary Examiner* — Daniel C Washburn
*Assistant Examiner* — Paul J. Mueller
(74) *Attorney, Agent, or Firm* — Kelsey M. Skodje

(57) ABSTRACT

A method, system, and computer program product are disclosed. The method includes processing an audio signal that includes speech data and transcribing the speech data to generate text data. The method also includes identifying a vulnerable portion of the text data and, in response, applying adversarial text to the text data to generate robust text data. Adversarial noise corresponding to the robust text data is generated and applied to the speech data.

20 Claims, 5 Drawing Sheets

(56) References Cited

U.S. PATENT DOCUMENTS

| | | | | |
|---|---|---|---|---|
| 2021/0342647 | A1* | 11/2021 | Gou | G06N 3/088 |
| 2023/0162723 | A1* | 5/2023 | Cui | G06N 3/048 704/9 |
| 2023/0245650 | A1* | 8/2023 | Cary | G10L 25/54 704/9 |

OTHER PUBLICATIONS

Behjati et al., "Universal Adversarial Attacks on Text Classifiers," ICASSP 2019, pp. 7345-7349.

Carlini et al., "Audio Adversarial Examples: Targeted Attacks on Speech-to-Text," https://arxiv.org/pdf/1807.01069.pdf, Mar. 30, 2018, 7 pgs.

Carlini et al., "Hidden Voice Commands," https://nicholas.carlini.com/papers/2016_usenix_hiddenvoicecommands.pdf, 2016, 18 pgs.

Dasgupta et al., "Gray-box Techniques for Adversarial Text Generation," CEUR-WS.org/Vol-2269/FSS-18_paper_52.pdf, Proceedings of the AAAI Fall 2018 Symposium on Adversary-Aware Learning Techniques and Trends in Cybersecurity, Oct. 18-19, 2018, 7 pgs.

Ebrahimi et al., "HotFlip: White-Box Adversarial Examples for Text Classification," arXiv:1712.06751v2 [cs.CL] May 24, 2018, 6 pgs.

Jin et al., "TextFool: Fool your Model with Natural Adversarial Text," printed Sep. 2, 2021, 10 pgs.

Li et al., "TEXTBUGGER: Generating Adversarial Text Against Real-world Applications," arXiv:1812.05271v1 [cs.CR] Dec. 13, 2018, 15 pgs.

Mell et al., "The NIST Definition of Cloud Computing," Recommendations of the National Institute of Standards and Technology, U.S. Department of Commerce, Special Publication 800-145, Sep. 2011, 7 pgs.

Nicolae et al., "Adversarial Robustness Toolbox v1.0.0," https://arxiv.org/pdf/1807.01069.pdf, Nov. 15, 2019, 34 pgs.

Tran et al., "Text Data Protection Against Automated Analysis," U.S. Appl. No. 17/101,465, filed Nov. 23, 2020.

Tuinhoff et al., "Published Content Protection," U.S. Appl. No. 17/083,566, filed Oct. 29, 2020.

Wang et al., "Towards A Robust Deep Neural Network in Texts: A Survey," https://arxiv.org/abs/1902.07285, arXiv:1902.07285v6 [cs.CL] Apr. 21, 2021, 22 pgs.

Zhang et al., "DolphinAttack: Inaudible Voice Commands," https://acmccs.github.io/papers/p103-zhangAemb.pdf, CCS'17, Oct. 30-Nov. 3, 2017, SessionA3: Adversarial Machine Learning, 15 pgs.

* cited by examiner

ADVERSARIAL SPEECH-TEXT PROTECTION AGAINST AUTOMATED ANALYSIS

STATEMENT REGARDING FEDERALLY SPONSORED RESEARCH OR DEVELOPMENT

This invention was made with Government support under HR001120C0013 awarded by the Defense Advanced Research Projects Agency (DARPA). The Government has certain rights to this invention.

BACKGROUND

The present disclosure relates to data protection and, more specifically, to adversarial content protection.

Digital text documents and audio signals (e.g., recorded speech) are used for communication and collaboration. In parallel, recent developments within the field of machine learning (e.g., natural language processing (NLP)) have enabled large scale automated text analysis using artificial intelligence (AI) to perform classification or information extraction (e.g., analysis of intents, named-entity recognition). However, if text and/or audio data is accessed by unauthorized third-parties, these parties may obtain personal and/or confidential information using automated text analysis.

SUMMARY

Various embodiments are directed to a method, which includes processing an audio signal that includes speech data and transcribing the speech data to generate text data. The audio signal may also include recorded adversarial noise, which may be removed prior to transcribing the speech data. The method also includes identifying a vulnerable portion of the text data and, in response to this identification, applying adversarial text to the text data to generate robust text data. Identifying the vulnerable portion can include generating importance scores for portions of the text data, and the vulnerable portion may be a portion of the text data with the highest importance score. Generating the adversarial text can include identifying a text portion that is semantically equivalent to the vulnerable portion and determining that replacing the vulnerable portion with this text portion reduces a confidence score associated with a prediction of a target machine-learning model. Adversarial noise corresponding to the robust text data is generated and applied to the speech data. In some embodiments, generating the corresponding adversarial noise includes designing the corresponding adversarial noise to cause speech-to-text models to produce a targeted transcription matching the robust text data. The targeted transcription can be at least 90% similar to the robust text data.

Further embodiments are directed to a system, which includes a memory and a processor communicatively coupled to the memory, wherein the processor is configured to perform the method. Additional embodiments are directed to a computer program product, which includes a computer readable storage medium having program instructions embodied therewith, the program instructions executable by a processor to cause a device to perform the method.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

DETAILED DESCRIPTION

Figure 1:
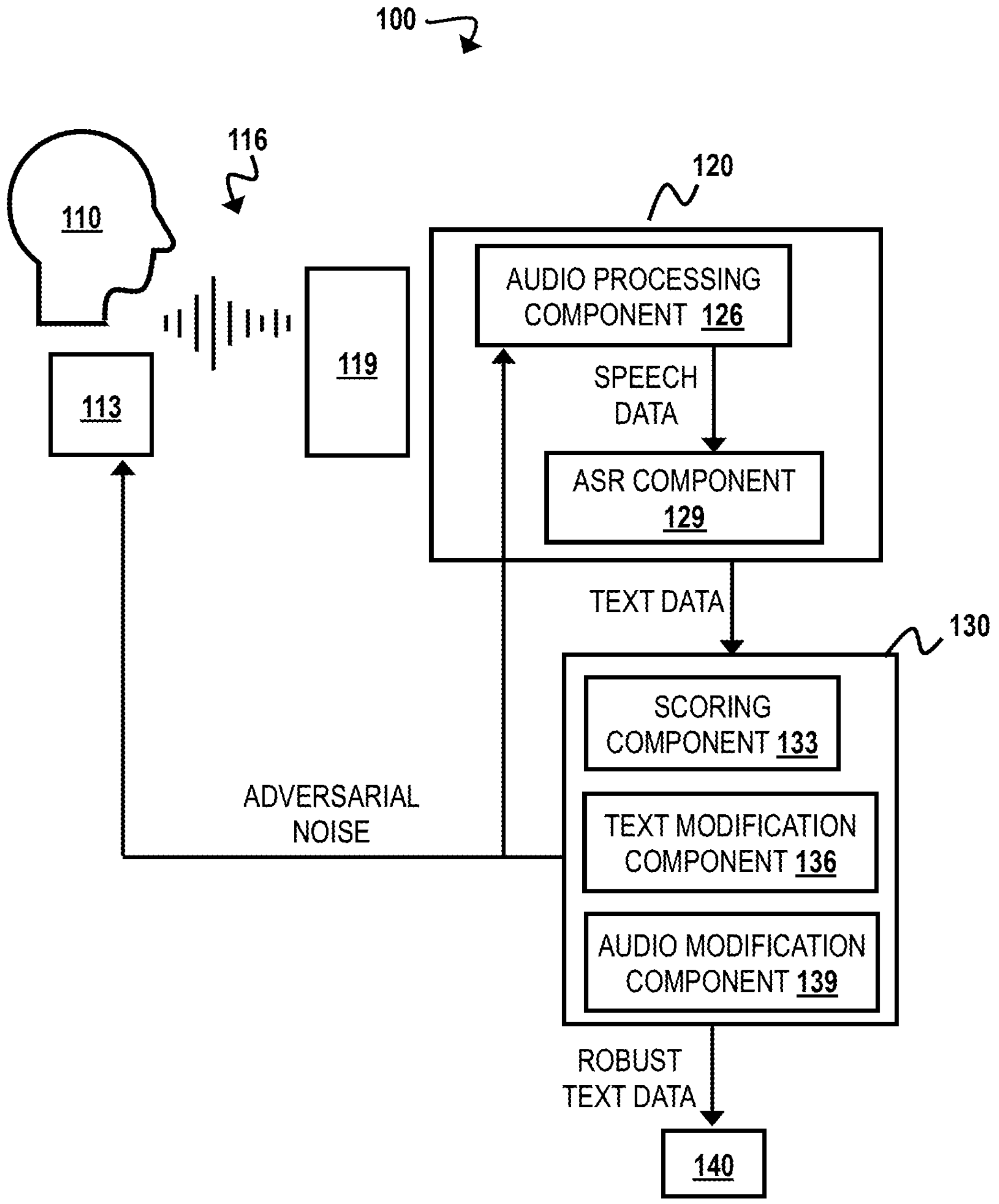
FIG. 1 is a block diagram illustrating an adversarial protection environment, according to some embodiments of the present disclosure.

Aspects of the present disclosure relate generally to the field of adversarial content protection. While the present disclosure is not necessarily limited to such applications, various aspects of the disclosure may be appreciated through a discussion of various examples using this context.

State-of-the-art artificial intelligence (AI) can enable the automated analysis of massive amounts of audio signals (e.g., recorded speech) as well as digital text. Speech-to-text models allow the transcription of spoken language into text format, which can then be used in further processing (e.g., clustering, text mining, filtering by key words, etc.). Text analysis can then be carried out by models that perform classification or information extraction (e.g., analysis of intent, named-entity recognition, etc.). Various techniques exist today that defend against an attacker accessing text or audio data. For example, adversarial patch injection is a technique that fools machine learning models without preventing communication between authorized parties.

Adversarial patch injection can protect an audio signal by modifying the audio signal to prevent automated analysis while making minimal changes to human perception of the audio. For example, a telephone call between two parties may apply adversarial noise to the signal, thereby preventing transcription of the audio data. Instead, the adversarial noise may cause automated analysis to detect silence or random utterances. However, the adversarial noise may be imperceptible to humans or at least minimal enough to allow effective communication between the two parties. Adversarial patch injection can also protect against an attacker with access to text, such as a transcription of an audio signal. For example, a transcription can be altered to include adversarial text that preserves semantic meaning while fooling AI models (e.g., text classification models, information extraction models, etc.).

However, existing techniques may be inadequate for situations in which an attacker has access to information in both audio and text formats. For example, a user or group of users may control a text editor via speech-to-text (e.g., to compose an email or take minutes in a meeting). In another example, users communicating via conferencing software may enable transcription in order to provide captions and/or keep records. In these examples, information exists as an audio recording with corresponding digital text. Both adversarial noise and adversarial text may be employed to protect the information. However, an automated analysis system may detect resulting differences between the altered audio and text. This may cause the system to flag the information as having adversarial protections in place and, therefore, potentially containing important content.

Disclosed herein are techniques that may prevent automated analysis from detecting adversarial protection of audio data (e.g., recorded speech) and corresponding text data (e.g., transcript of the recorded speech). In some embodiments, an audio signal is recorded and processed to remove adversarial noise. Speech data from the audio signal can be transcribed to generate text data. Adversarial text can be generated and applied to the text data to increase the robustness of the text data. The adversarial text can include text modifications semantically equivalent to vulnerable portions of the text data. A "portion" of text and/or speech data may include characters/letters, words, phrases, sentences, paragraphs, sections, etc. "Semantically equivalent text" may refer to a replacement for a portion of a text document that preserves the semantic meaning of the original text. Adversarial noise that corresponds to the robust text data can then be generated and applied to the speech data. The adversarial noise can cause speech-to-text models to generate transcriptions that match the robust text data. This can prevent automatic detection of differences between the speech and text data that may result from using adversarial text protection without corresponding adversarial noise.

It is to be understood that the aforementioned advantages are example advantages and should not be construed as limiting. Embodiments of the present disclosure can contain all, some, or none of the aforementioned advantages while remaining within the spirit and scope of the present disclosure.

Turning now to the figures, FIG. 1 is a schematic diagram illustrating an adversarial protection environment 100, according to some embodiments of the present disclosure. Environment 100 can include a user 110 and/or an audio generator 113 that can produce speech recorded as an audio signal 116. Environment 100 can also include an audio module 120 that can include an audio recorder 119 and an automatic speech recognition (ASR) component 126. Additionally, environment 100 can include a defense module 130 that can include a scoring component 133, a text modification component 136, and an audio modification component 136.

The audio recorder 119 can dynamically record and store an audio signal 116 containing speech data from a user 110 and, in some embodiments, additional noise (e.g., generated noise from the audio generator 113, incidental background noise). While one user 110 is illustrated in FIG. 1, there can be at least one additional source of speech data in some embodiments, such as when the audio recorder 119 is recording a meeting with multiple participants. These sources can be in the same physical location (e.g., a conference room, classroom, etc.) or in multiple locations, such as when users are communicating via telephone, web conferencing application, etc. In some embodiments, speech data can be provided by the audio generator 113. For example, the audio generator 113 can include an electronic speaker.

The audio signal 116 may also include non-speech noise. For example, adversarial noise may be introduced by the audio generator 113 and recorded by the audio recorder 119 together with the speech data. The additional noise may include adversarial noise generated to prevent the automated analysis of speech data from an unauthorized recording of the audio signal 116. The audio signal 116 may also include incidental background noise (e.g., environmental sounds).

The audio processing component 126 can receive and analyze physical properties associated with the audio signal 116. For example, the audio processing component 126 may undergo various data analytics functions to analyze audio signals 116 communicated from one or more sources (e.g., the user 110 and/or audio generator 113). Recorded non-speech noise (e.g., adversarial and/or background noise) may be removed from the audio signal 116 by the audio processing component 126 prior to transcription of the speech data in the audio signal 116.

The transcription can be carried out by the ASR component 129 using natural language processing (NLP) to generate text data. The ASR component 129 may also perform additional functions, such as identifying/labeling different speech sources in some embodiments. This text data can then be relayed to the defense module 130, which can identify vulnerable portions of the text data and apply adversarial text to increase the robustness of the text data.

The scoring component 133 can evaluate the vulnerability/robustness of the original text. "Robustness" can refer to the ability of text data to withstand automated analysis using machine learning (ML) models associated with NLP tasks (e.g., text classification, summarization, named-entity recognition, machine translation, question answering, etc.). In some embodiments, a vulnerable portion of the original text data can be identified by calculating how much modifying (e.g., deleting or replacing) that portion would alter a confidence score of a prediction made by a target ML model before and after the modification. The scoring component 133 can include ML models associated with NLP tasks, such as, for example, classification, summarization, named-entity recognition, machine translation, and question answering. For example, the scoring component 133 may use an ML model represented by a function $F(x)=y$, where an input x is mapped to an output or prediction y with a specific confidence score. This is discussed in greater detail with respect to FIG. 2.

The text modification component 136 can include at least one strategy to modify one or more portions of the text data (e.g., vulnerable portions identified by the scoring component 133) to make the text data more robust, while maintaining the original semantic meaning. The modification strategies implemented by the text modification component 136 may be based on the adversarial text attacks used by the scoring component 133 and may include, for example, deletion, insertion, and/or replacement of characters/letters, words, phrases/sentences, etc.

For example, the scoring component 133 can determine whether a confidence score for modified text data is less than a confidence score generated for the original text data. The text modification component 136 can test the potential modifications using the scoring component 133. To do so, the scoring component 133 may apply each modification to the text data and input the modified text data into a target ML model. A new confidence score associated with a resulting output from the target ML model can be determined for each modification. The text modification component 136 may select adversarial text from a modification that results in the greatest vulnerability reduction (e.g., the lowest confidence score).

The adversarial text can be applied to the text data in order to generate robust text. The robust text data may be stored (e.g., in a computer memory, a database, cloud storage, etc.) and/or transmitted to an authorized recipient 140 such as a second user (e.g., via email, file-sharing, etc.). The audio modification component 139 can generate adversarial noise that corresponds to the robust text (see FIG. 2). While the adversarial noise affects automated processing (e.g., automatically parsing and analyzing spoken content) of the audio signal 116, the noise can be low enough for humans to understand the speech or imperceptible to humans. In some embodiments, the audio modification component 139 may relay the corresponding adversarial noise to the audio generator 113, which can add the adversarial noise to the audio signal 116, and the audio processing component 126, which can then remove the adversarial noise prior to transcription.

Figure 2:
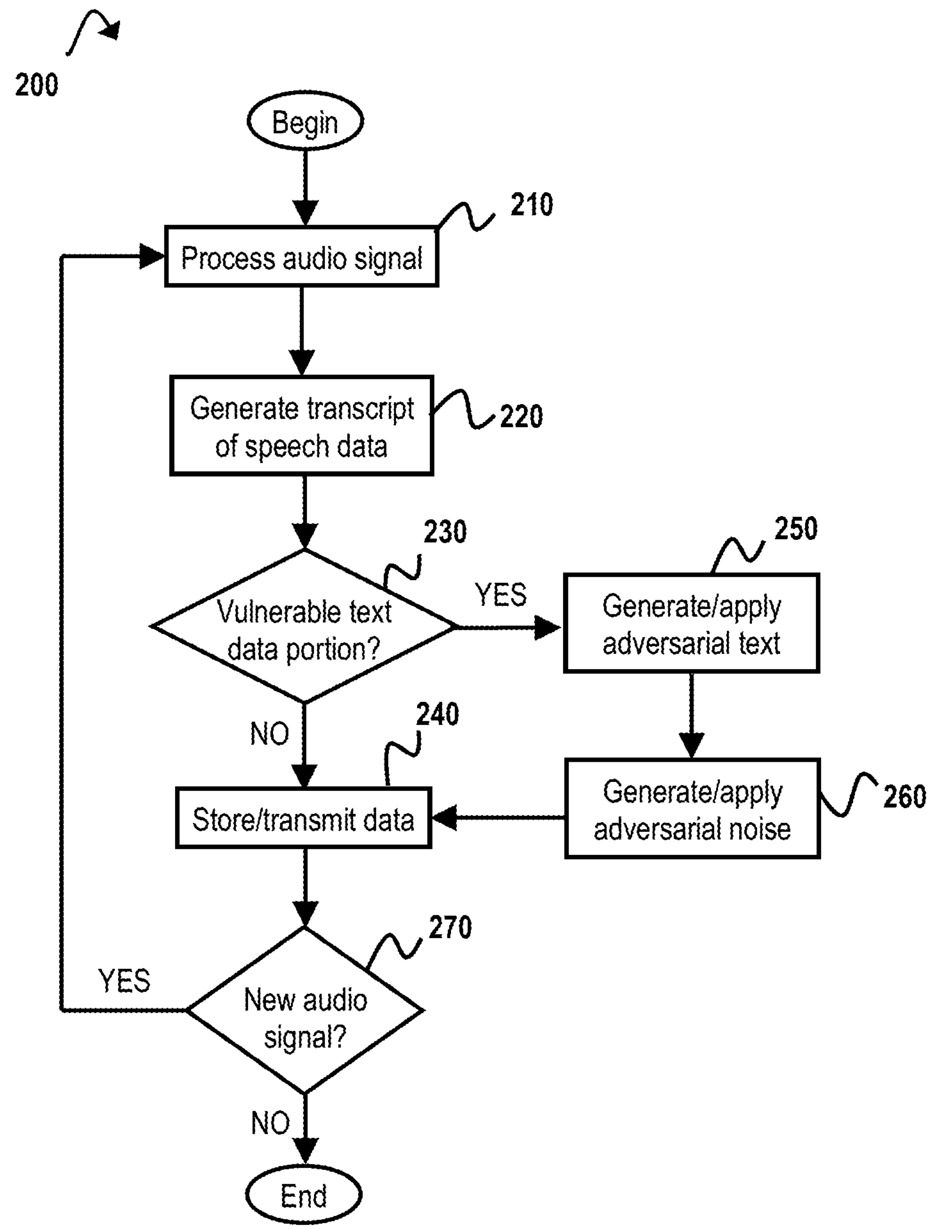
FIG. 2 is a flow diagram illustrating a process of providing adversarial content protection, according to some embodiments of the present disclosure.

FIG. 2 is a flow diagram illustrating a process 200 of providing adversarial content protection, according to some embodiments of the present disclosure. To illustrate process 200, but not to limit embodiments, FIG. 2 is described within the context of the adversarial protection environment 100 illustrated in FIG. 1. Where elements referred to in FIG. 2 are identical to elements shown in FIG. 1, the same reference numbers are used in each figure.

An audio signal 116 is processed. This is illustrated at operation 210. The audio signal can contain speech data and/or other noise and can be recorded by the audio recorder 119. Source(s) of the audio signal can include at least one person (e.g., user 110) and/or other source of sound (e.g., audio generator 113). Processing the audio signal 116 can include removing environmental noise and/or adversarial noise injected into the audio signal by the audio generator 113. The noise removal can be carried out by the audio processing component 126. In some embodiments, adversarial noise is not present initially, but is applied at operation 260 (see below). In these instances, the audio processing component 126 may use information from the defense module 130 (e.g., the audio modification component 139) to target and remove the applied adversarial noise. Removal of adversarial noise from the audio signal results in speech data that can be automatically analyzed using NLP.

The speech data is transcribed to generate text data. This is illustrated at operation 220. The ASR component 129 can transcribe the speech data using any appropriate ASR techniques known in the art, such as natural language processing (NLP) techniques. The transcription results in text data that corresponds to the speech data. The text data can be sent to the defense module 130 in order to evaluate its robustness/vulnerability to automatic analysis.

The text data can be evaluated by determining whether there is a vulnerable portion of the text data. This is illustrated at operation 230. In some embodiments, a vulnerable portion of the text data can be identified by the scoring component 133 based on the effect modifying (e.g., deleting or replacing) that portion has on the confidence score of a prediction made by a target ML model before and after the modification. The scoring component 133 can use adversarial text attacks intended to take advantage of weaknesses in a given ML model.

For example, there can be a target ML model represented by a function F(x)=y, where an input x is mapped to an output or prediction y with a specific confidence score. A minimum modification may be applied to an input portion of text x to decrease the confidence score associated with the output/prediction y based on the original text data. In some embodiments, the modifications to the input x implemented by the adversarial text attacks can cause the target ML model to produce an incorrect output or prediction relative to the original y. Examples of adversarial text attacks may include character-level attack, word-level attack, and phrase- or sentence-level attack. The attack type may determine the type of modification applied to the text data. The scoring component 133 may implement respective scoring functions of the adversarial text attacks to calculate the robustness/vulnerabilities of the text data at a given level.

In some embodiments, text data may be considered to have a low vulnerability (e.g., high robustness score) if an output of an ML model receiving the text data as input does not produce a confidence score above a threshold confidence score. Additionally, text data may be considered to have a low vulnerability/high robustness score if no minimum modification can be made to the text data that can significantly impact the output (e.g., decrease confidence score by a threshold amount) of the ML model receiving the modified text data. Text data may be considered to have a high vulnerability (e.g., low robustness score) if an output of an ML model receiving the text data as input produces a high confidence score. The text data may also have a high vulnerability if a minimum modification can be made to the text data (e.g., replacing one word) to significantly impact the output or prediction of the ML model receiving the minimally modified text data.

In order to determine the text robustness/vulnerability, the scoring component 133 may first determine an importance score associated with each portion of the text data. For example, an importance score of a portion of text data may be associated with the contribution or impact of that portion of the text data to the outcome or prediction of a target ML model receiving that text data as input.

The importance score may be calculated at the character level, word level, phrase level, sentence level, etc. based on the adversarial text attack that is used for the scoring function. In some embodiments, the scoring component 133 may utilize multiple adversarial text attacks to score portions of the text data and return a unified importance score for the text data. For example, the scoring component 133 may generate the unified importance score based on a weighted average of the importance scores. The scoring component 133 may apply a greater or lesser weight to adversarial text attacks based on the strength and/or the frequency of use of the attack type. For example, adversarial text attacks that are highly effective and frequently used (e.g., attacks based on projected gradient descent (PGD)) may be given greater weight. In other embodiments, the scoring component 133 can apply an equal weight to all of the adversarial text attacks by default. There may also be an option to customize the weights applied to the adversarial text attacks.

In the aforementioned example of a target ML model represented by a function F(x)=y, the scoring component 133 may receive the text data "she agrees that it is suitable" as input. Given the input the text data, the classifier F may predict an output label P with a confidence score of 0.9 (e.g., 90% probability that the input sentence is output label P). Then, in order to determine whether the text data is robust, the scoring component 133 may determine whether the original prediction of the classifier F can be significantly changed by a small modification to the text data. For example, the text modification component 136 may implement a word-level attack that allows the scoring component 133 to determine the importance of each word within the text data. In this example, the importance of a specific word within a sentence may be measured by determining a difference between outputs of classifier F receiving input text data with and without the specific word.

$$Score(\text{``she''}) = F(\text{``she agrees that it is suitable''}) - F(\text{``agree that it is suitable''})$$

$$Score(\text{``agrees''}) = F(\text{``she agrees that it is suitable''}) - F(\text{``she that it is suitable''})$$

Score("that")=*F*("*she* agrees that it is usable")−*F*("*she* agrees it is suitable")

Score("it")=*F*("*she* agrees that it is suitable")−*F*("*she* agrees that is suitable")

Score("is")=*F*("*she* agrees that it is suitable")−*F*("*she* agrees that it suitable")

Scorer("suitable")=*F*("*she* agrees that it is suitable")−*F*("*she* agrees that it is")

Based on the above scores, it can be determined which portion (e.g., word) of the text data has the highest impact (e.g., highest importance score) on the prediction of the classifier F. For example, a vulnerable portion of text data can be detected based on a ranking of importance scores determined for text data portions and impact of the text data portions on confidence scores of predictions made by ML models. In the example above, the scoring component 133 may determine that the word "agrees" had the highest important score and greatest impact on the confidence score associated with an output label P predicted by the classifier F. Further, because the word "agrees" had the highest importance score, modifying this portion of the sentence may significantly change the confidence score associated with the prediction of the classifier F. The scoring component 133 may therefore designate the word "agrees" as the least textually robust/most vulnerable portion of "she agrees that it is suitable".

If no vulnerable text data portion is detected at operation 230, the original text data may be stored and/or transmitted to an intended recipient 140. This is illustrated at operation 240. However, if a vulnerable text data portion is identified at operation 230, adversarial text can be generated and applied to the text data. This is illustrated at operation 250.

At operation 250, text modification component 136 can generate adversarial text to modify a vulnerable portion of the text data identified at operation 230. For example, the text modification component 136 may implement a word replacement strategy to modify the vulnerable portion of the text data. Referring to the example above, this may include using a word embedding process to search for a nearest neighbor in the embedding space of the identified vulnerable word ("agrees"). In some embodiments, the word embedding process maps the word "agrees" to its numerical representation (or vector) where words that are semantically equivalent (e.g., words that have the same meaning or are close in meaning) can have similar numerical representations in the embedding space. In this example, the word embedding process applied to the word "agrees" may identify three replacement words ("approves", "accepts", and "thinks") as being semantically equivalent.

In order to select a text modification for the adversarial text, the scoring component 133 may generate new confidence scores based on the text data as modified with the identified replacement words. That is, the scoring component 133 may replace the word having the highest importance score in the text data (e.g., the vulnerable word "agrees") with each of the replacement words and evaluate the performance of the target ML model (classifier F) based on the substitution in the text data, as shown below:

F("she agrees that it is suitable")=output label P; confidence score: 0.9 [original text]

F("she approves that it is suitable")=output label P; confidence score: 0.6

F("she accepts that it is suitable")=output label P; confidence score: 0.5

F("she thinks that it is suitable")=output label P; confidence score: 0.3

In some embodiments, the text modification component 136 can rank the potential modifications to the text data in order to identify the slightest modification having the most significant impact on the output of a target model. Based on the calculations above, the text modification component 136 may determine that replacing the word "agrees" with "thinks" would have the most significant impact on the output of the target model (e.g., decreasing the confidence score from 0.9 to 0.3), followed by the words "accepts" and "approves." The text modification component 136 may rank the replacement words based on the amount of decrease between the original confidence score and the respective confidence scores produced by each replacement word.

The text modification component 136 can apply the adversarial text using any adversarial text injection techniques known to those of ordinary skill in the art. In some embodiments, adversarial text is selected based on ranking. Referring to the example above, the text modification component 136 may replace the word "agrees" with the adversarial text "thinks" in the text data. However, in some embodiments, there may be only one semantically equivalent text modification identified. In these instances, the modification may be selected if the resulting confidence score is less than that of the original text.

Adversarial noise corresponding to the robust text data can then be generated and applied to the audio signal 116. This is illustrated at operation 260. The adversarial noise can be designed to cause speech-to-text models to produce targeted transcriptions matching the robust text data. For example, the adversarial noise may result in a transcript of the speech data that is above a threshold similarity to the robust text data (e.g., a transcript at least 90% similar to the robust text data). Continuing the example above, the audio modification component 139 can generate adversarial noise causing the recorded utterance of the word "agrees" to be transcribed as "thinks". In some embodiments, the adversarial noise is applied using the audio generator 113. The audio processing component 126 may be updated with the generated adversarial noise in order to facilitate removal of the noise at operation 210 (e.g., when a new audio signal is received at operation 270). The robust text generated at operation 250 can be stored in a computer memory (e.g., memory 304 illustrated in FIG. 3) and/or transmitted to an authorized recipient 140 at operation 240.

It can then be determined whether a new audio signal has been received by the audio recorder 119. This is illustrated at operation 270. If the audio processing component 126 determines that a new audio signal has not been received, process 200 can end. However, if a new audio signal is received and recorded, process 200 can return to operation 210 to process the new audio signal. While not illustrated in FIG. 2, if the audio signal does not include speech data, process 200 may end at operation 210 or 220. Process 200 may be repeated until no audio signal is detected at operation 270 or until otherwise instructed to stop.

Figure 3:
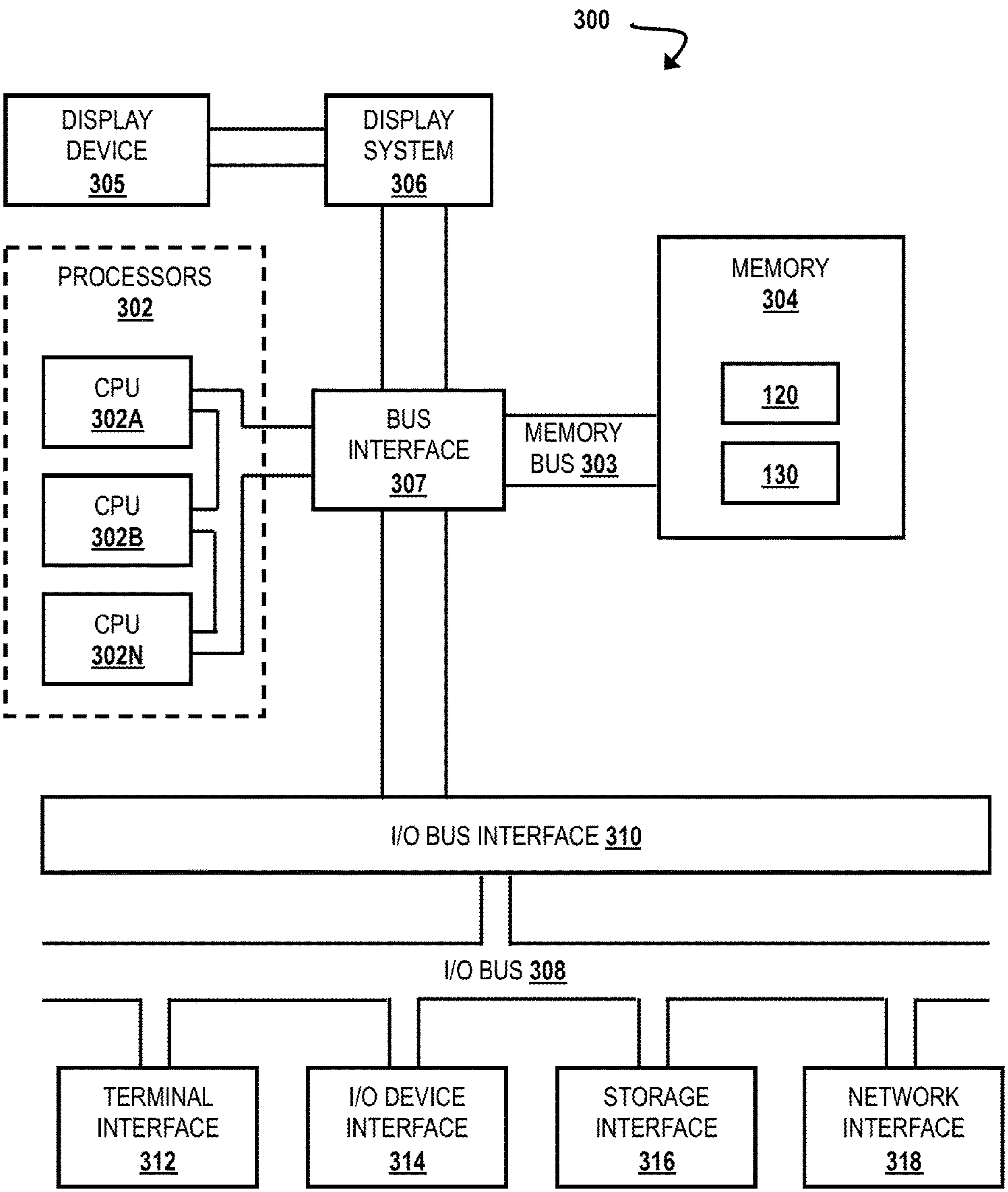
FIG. 3 is a block diagram illustrating a computer system, according to some embodiments of the present disclosure.

FIG. 3 is a block diagram illustrating an exemplary computer system 300 that can be used in implementing one or more of the methods, tools, components, and any related functions described herein (e.g., using one or more processor circuits or computer processors of the computer). In some embodiments, the major components of the computer system 300 comprise one or more processors 302, a memory subsystem 304, a terminal interface 312, a storage interface 316, an input/output device interface 314, and a network interface 318, all of which can be communicatively coupled, directly or indirectly, for inter-component communication via a memory bus 303, an input/output bus 308, bus interface unit 307, and an input/output bus interface unit 310.

The computer system 300 contains one or more general-purpose programmable central processing units (CPUs) 302A, 302B, and 302-N, herein collectively referred to as the CPU 302. In some embodiments, the computer system 300 contains multiple processors typical of a relatively large system; however, in other embodiments the computer system 300 can alternatively be a single CPU system. Each CPU 302 may execute instructions stored in the memory subsystem 304 and can include one or more levels of on-board cache.

The memory 304 can include a random-access semiconductor memory, storage device, or storage medium (either volatile or non-volatile) for storing or encoding data and programs. In some embodiments, the memory 304 represents the entire virtual memory of the computer system 300 and may also include the virtual memory of other computer systems coupled to the computer system 300 or connected via a network. The memory 304 is conceptually a single monolithic entity, but in other embodiments the memory 304 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory can be further distributed and associated with different CPUs or sets of CPUs, as is known in any of various so-called non-uniform memory access (NUMA) computer architectures.

The audio module 120 and defense module 130 (FIG. 1), are illustrated as being included within the memory 304 in the computer system 300. However, in other embodiments, some or all of these components may be on different computer systems and may be accessed remotely, e.g., via a network. The computer system 300 may use virtual addressing mechanisms that allow the programs of the computer system 300 to behave as if they only have access to a large, single storage entity instead of access to multiple, smaller storage entities. Thus, though the audio module 120 and defense module 130 are illustrated as being included within the memory 304, components of the memory 304 are not necessarily all completely contained in the same storage device at the same time. Further, although these components are illustrated as being separate entities, in other embodiments some of these components, portions of some of these components, or all of these components may be packaged together.

In an embodiment, the audio module 120 and the defense module 130 include instructions that execute on the processor 302 or instructions that are interpreted by instructions that execute on the processor 302 to carry out the functions as further described in this disclosure. In another embodiment, the audio module 120 and the defense module 130 are implemented in hardware via semiconductor devices, chips, logical gates, circuits, circuit cards, and/or other physical hardware devices in lieu of, or in addition to, a processor-based system. In another embodiment, the audio module 120 and the defense module 130 include data in addition to instructions.

Although the memory bus 303 is shown in FIG. 3 as a single bus structure providing a direct communication path among the CPUs 302, the memory subsystem 304, the display system 306, the bus interface 307, and the input/output bus interface 310, the memory bus 303 can, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the input/output bus interface 310 and the input/output bus 308 are shown as single respective units, the computer system 300 may, in some embodiments, contain multiple input/output bus interface units 310, multiple input/output buses 308, or both. Further, while multiple input/output interface units are shown, which separate the input/output bus 308 from various communications paths running to the various input/output devices, in other embodiments some or all of the input/output devices may be connected directly to one or more system input/output buses.

The computer system 300 may include a bus interface unit 307 to handle communications among the processor 302, the memory 304, a display system 306, and the input/output bus interface unit 310. The input/output bus interface unit 310 may be coupled with the input/output bus 308 for transferring data to and from the various input/output units. The input/output bus interface unit 310 communicates with multiple input/output interface units 312, 314, 316, and 318, which are also known as input/output processors (IOPs) or input/output adapters (IOAs), through the input/output bus 308. The display system 306 may include a display controller. The display controller may provide visual, audio, or both types of data to a display device 305. The display system 306 may be coupled with a display device 305, such as a standalone display screen, computer monitor, television, or a tablet or handheld device display. In alternate embodiments, one or more of the functions provided by the display system 306 may be on board a processor 302 integrated circuit. In addition, one or more of the functions provided by the bus interface unit 307 may be on board a processor 302 integrated circuit.

In some embodiments, the computer system 300 is a multi-user mainframe computer system, a single-user system, or a server computer or similar device that has little or no direct user interface but receives requests from other computer systems (clients). Further, in some embodiments, the computer system 300 is implemented as a desktop computer, portable computer, laptop or notebook computer, tablet computer, pocket computer, telephone, smart phone, network switches or routers, or any other appropriate type of electronic device.

It is noted that FIG. 3 is intended to depict the representative major components of an exemplary computer system 300. In some embodiments, however, individual components may have greater or lesser complexity than as represented in FIG. 3, Components other than or in addition to those shown in FIG. 3 may be present, and the number, type, and configuration of such components may vary.

In some embodiments, the data storage and retrieval processes described herein could be implemented in a cloud computing environment, which is described below with respect to FIGS. 4 and 5. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher-level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
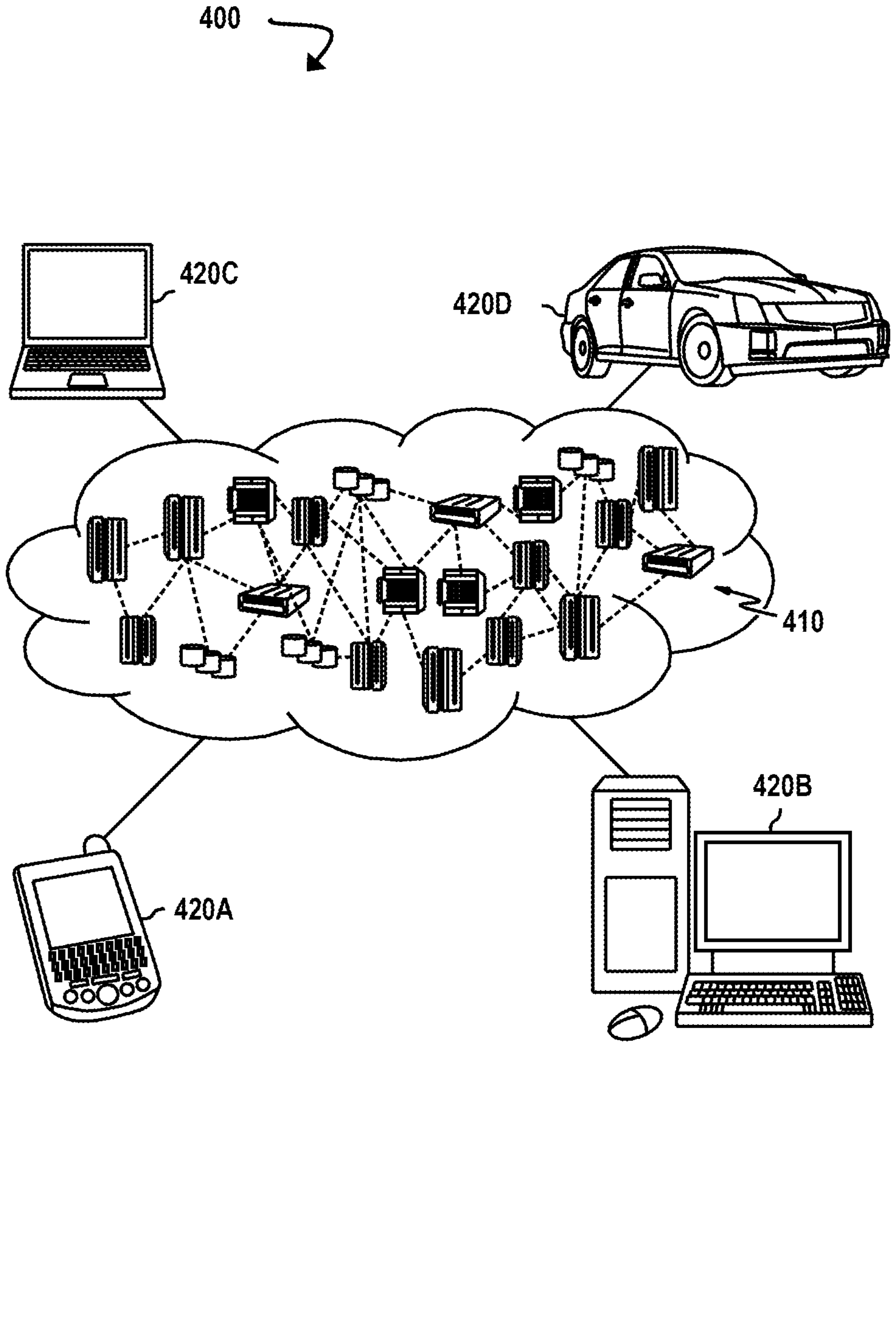
FIG. 4 is a block diagram illustrating a cloud computing environment, according to some embodiments of the present disclosure.

FIG. 4 is a block diagram illustrating a cloud computing environment 400, according to some embodiments of the present disclosure. As shown, cloud computing environment 400 includes one or more cloud computing nodes 410 with which local computing devices used by cloud consumers, such as, for example, personal digital assistant (PDA) or cellular telephone 420A, desktop computer 420B, laptop computer 420C, and/or automobile computer system 420D may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 420A-420D shown in FIG. 4 are intended to be illustrative only and that computing nodes 410 and cloud computing environment 400 can communicate with any type of computerized device over any type of network and/or network addressable connection (e.g., using a web browser).

Figure 5:
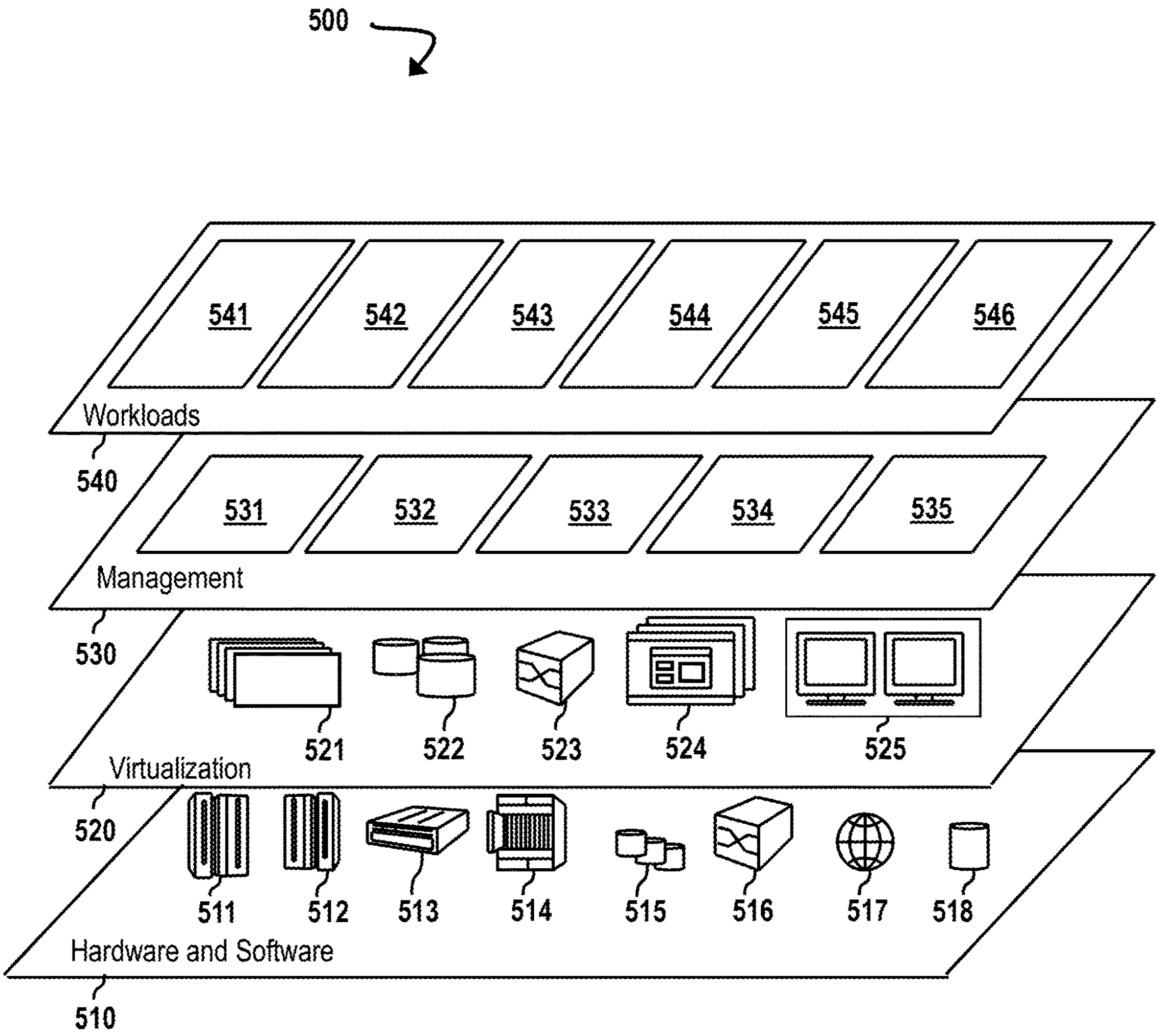
FIG. 5 is a block diagram illustrating a set of functional abstraction model layers provided by the cloud computing environment, according to some embodiments of the present disclosure.

FIG. 5 is a block diagram illustrating a set of functional abstraction model layers 500 provided by the cloud computing environment 400, according to some embodiments of the present disclosure. It should be understood in advance that the components, layers, and functions shown in FIG. 5 are intended to be illustrative only and embodiments of the invention are not limited thereto. As depicted, the following layers and corresponding functions are provided:

Hardware and software layer 510 includes hardware and software components. Examples of hardware components include: mainframes 511; RISC (Reduced Instruction Set Computer) architecture-based servers 512; servers 513; blade servers 514; storage devices 515; and networks and networking components 516. In some embodiments, software components include network application server software 517 and database software 518.

Virtualization layer 520 provides an abstraction layer from which the following examples of virtual entities may be provided: virtual servers 521; virtual storage 522; virtual networks 523, including virtual private networks; virtual applications and operating systems 524; and virtual clients 525.

In one example, management layer 530 provides the functions described below. Resource provisioning 531 provides dynamic procurement of computing resources and other resources that are utilized to perform tasks within the cloud computing environment. Metering and Pricing 532 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 533 provides access to the cloud computing environment for consumers and system administrators. Service level management 534 provides cloud computing resource allocation and management such that required service levels are met. Service Level Agreement (SLA) planning and fulfillment 535 provide pre-arrangement for, and procurement of, cloud computing resources for which a future requirement is anticipated in accordance with an SLA.

Workloads layer 540 provides examples of functionality for which the cloud computing environment can be utilized. Examples of workloads and functions that can be provided from this layer include: mapping and navigation 541; software development and lifecycle management 542; virtual classroom education delivery 543; data analytics processing 544; transaction processing 545; and adversarial speech-text protection 546.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the present disclosure.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof.

In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

When different reference numbers comprise a common number followed by differing letters (e.g., 100*a*, 100*b*, 100*c*) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, and item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; ten of item C; four of item B and seven of item C; or other suitable combinations.

What is claimed is:

1. A method, comprising:
- processing an audio signal comprising speech data;
- transcribing the speech data to generate text data;
- identifying a vulnerable portion of the text data;
- in response to the identifying, modifying the text data to generate a robust transcript, wherein the modifying comprises replacing the vulnerable portion of the text data with adversarial text;
- designing adversarial noise corresponding to the adversarial text; and
- applying the corresponding adversarial noise to the audio signal to generate a robust audio signal comprising modified speech data that, when transcribed, generates a transcript with a similarity to the robust transcript that is above a threshold similarity.

2. The method of claim 1, wherein the corresponding adversarial noise comprises adversarial speech data designed to cause speech-to-text models to produce a targeted transcription of the modified speech data matching the robust transcript.

3. The method of claim 2, wherein the targeted transcription is at least 90% similar to the robust transcript.

4. The method of claim 1, wherein the identifying the vulnerable portion comprises generating importance scores for portions of the text data, and wherein the vulnerable portion is a portion of the text data with a highest importance score.

5. The method of claim 1, further comprising selecting the adversarial text, wherein the selecting the adversarial text comprises:
- identifying, in an embedding space of a word from the vulnerable portion, a word that is semantically equivalent to the word from the vulnerable portion; and
- determining that replacing the word from the vulnerable portion with the identified semantically equivalent word reduces a confidence score associated with a prediction of a target machine-learning model.

6. The method of claim 1, wherein the audio signal further comprises adversarial non-speech noise.

7. The method of claim 6, wherein the processing the audio signal comprises removing the adversarial non-speech noise prior to transcribing the speech data.

8. The method of claim 1, wherein the replacing the vulnerable portion comprises using a word embedding process to replace a word in the vulnerable portion with a semantically equivalent word.

9. The method of claim 8, wherein the applying the corresponding adversarial noise replaces an utterance of the word in the audio signal with an utterance of the semantically equivalent word.

10. The method of claim 1, wherein:
the modifying the text data comprises deleting a word from the vulnerable portion; and
the applying the corresponding adversarial noise comprises deleting an utterance of the word from the audio signal.

11. A system, comprising:
a memory; and
a processor communicatively coupled to the memory, wherein the processor is configured to perform a method comprising:
processing an audio signal comprising speech data;
transcribing the speech data to generate text data;
identifying a vulnerable portion of the text data;
in response to the identifying, modifying the text data to generate a robust transcript, wherein the modifying comprises replacing the vulnerable portion of the text data with adversarial text;
designing adversarial noise corresponding to the adversarial text; and
applying the corresponding adversarial noise to the audio signal to generate a robust audio signal comprising modified speech data that, when transcribed, generates a transcript with a similarity to the robust transcript that is above a threshold similarity.

12. The system of claim 11, wherein the corresponding adversarial noise comprises adversarial speech data designed to cause speech-to-text models to produce a targeted transcription of the modified speech data matching the robust transcript.

13. The system of claim 11, wherein the identifying the vulnerable portion comprises generating importance scores for portions of the text data, and wherein the vulnerable portion is a portion of the text data with a highest importance score.

14. The system of claim 11, further comprising selecting the adversarial text, wherein the selecting the adversarial text comprises:
identifying, in an embedding space of a word from the vulnerable portion, a word that is semantically equivalent to the word from the vulnerable portion; and
determining that replacing the word from the vulnerable portion with the identified semantically equivalent word reduces a confidence score associated with a prediction of a target machine-learning model.

15. The system of claim 11, wherein the audio signal further comprises adversarial non-speech noise.

16. The system of claim 15, wherein the processing the audio signal comprises removing the adversarial non-speech noise prior to transcribing the speech data.

17. A computer program product, the computer program product comprising a computer readable storage medium having program instructions embodied therewith, the program instructions executable by a processor to cause a device to perform a method, the method comprising:
processing an audio signal comprising speech data;
transcribing the speech data to generate text data;
identifying a vulnerable portion of the text data;
in response to the identifying, modifying the text data to generate a robust transcript, wherein the modifying comprises replacing the vulnerable portion of the text data with adversarial text;
designing adversarial noise corresponding to the adversarial text; and
applying the corresponding adversarial noise to the audio signal to generate a robust audio signal comprising modified speech data that, when transcribed, generates a transcript with a similarity to the robust transcript that is above a threshold similarity.

18. The computer program product of claim 17, wherein the identifying the vulnerable portion comprises generating importance scores for portions of the text data, and wherein the vulnerable portion is a portion of the text data with a highest importance score.

19. The computer program product of claim 17, further comprising selecting the adversarial text, wherein the selecting the adversarial text comprises:
identifying, in an embedding space of a word from the vulnerable portion, a word that is semantically equivalent to the word from the vulnerable portion; and
determining that replacing the word from the vulnerable portion with the identified semantically equivalent word reduces a confidence score associated with a prediction of a target machine-learning model.

20. The computer program product of claim 17, wherein the processing the audio signal comprises removing adversarial non-speech noise prior to transcribing the speech data.

* * * * *